United States Patent [19]

Kowalk

[11] Patent Number: 5,007,048
[45] Date of Patent: Apr. 9, 1991

[54] CIRCUIT ARRANGEMENT FOR AVOIDING OVERLOAD IN A WIDEBAND SWITCHING SYSTEM

[75] Inventor: Wolfgang Kowalk, Nürnberg, Fed. Rep. of Germany

[73] Assignee: U.S. Philips Corporation, New York, N.Y.

[21] Appl. No.: 251,632

[22] Filed: Sep. 29, 1988

[51] Int. Cl.⁵ .............................................. H04Q 11/04
[52] U.S. Cl. .................................... 370/60; 370/94.1
[58] Field of Search ............... 370/60, 94, 60.1, 94.1; 379/114, 133, 134

[56] References Cited

U.S. PATENT DOCUMENTS

| | | | |
|---|---|---|---|
| 3,941,935 | 3/1976 | Vicentini et al. | 379/114 |
| 4,443,875 | 4/1984 | Blausten | 370/60 |
| 4,538,030 | 8/1985 | Fossett et al. | 379/114 |
| 4,561,090 | 12/1985 | Turner | 370/60 |
| 4,611,322 | 9/1986 | Larson et al. | 370/60 |

FOREIGN PATENT DOCUMENTS 183592  6/1986  European Pat. Off. .

OTHER PUBLICATIONS

Y. S. Yeh et al, "The Knock-out Switch: A simple, modular architecture . . . " International Switching Symp., 3/19/87, vol. 3, pp. 801–808.

J. S. Turner, "New Directions in Communications" Proc. Intl. Seminar on Digital Communications, 3/11–13/86, Zurich, Switzerland, pp. 25–32.

Primary Examiner—Douglas W. Olms
Attorney, Agent, or Firm—Anne E. Barschall

[57] ABSTRACT

For avoiding overload in a wideband switching system, in which the messages are subdivided into blocks and transmitted over wideband transmission links according to an asynchronous time-division multiplex method, it is known to arrange bidirectional counters assigned to the different subscribers in the switching nodes. By means of the count of the bidirectional counter it can be easily verified whether the maximum and mean transmission rates determined by the subscriber station are adhered to.

For avoiding overload and for charge-metering the switching node comprises two up-counters—in lieu of one bidirectional counter—for each subscriber station. This enables establishing both the duration of the connection and the number of blocks transmitted during this connection. From the ratio between the counts a criterion is derived to recognize overload.

8 Claims, 1 Drawing Sheet

CIRCUIT ARRANGEMENT FOR AVOIDING OVERLOAD IN A WIDEBAND SWITCHING SYSTEM

BACKGROUND OF THE INVENTION

In the scope of the development of future integrated wideband networks discussions are held about which method is to be selected for the transmission of the digital or analog information —partly requiring much bandwidth —in digital networks. The availability of wideband networks depends on many factors, among other things on the standardization, the cost-effective oPtical wideband transmission, VLSI circuits for very high processing rates, as well as the requirements of the user and the network operator. The concept of such wideband networks is based on the recently established integrated services communications network ISDN (Integrated Services Digital Network).

A first option for extending the integrated services communications network ISDN consists in the allocation of a limited number of wideband channels, a physical connection being established for each wideband channel. However, the thus established network with circuit switching does not meet all the requirements of the network operator with respect to an adaptable network for transmitting any services, among them such services that do not yet have internationally standardized parameters, as well as requirements with respect to future services.

In the European Patent Application EP-A-0-183-592 a wideband switching system was proposed, in which the messages are subdivided into blocks (cells) and transmitted over wideband transmission links according to an a synchronous time-division multiplex method. The blocks (cells) can have equal or different lengths. The blocks comprise useful information as well as address information, the address information being comprised in a so-called header. The number of bits of a block indicates its length, in the standardization proposals values between 120 and 256 bits being provided for the useful information and 32 or 16 bits for the header. The time intervals in which blocks are transmitted are denoted frames. A frame can contain a valid block or be empty. Between two subscribers of the wideband switching system there is a "virtual connection", which is maintained in that the blocks transmitted from the subscriber stations are provided with unambiguous header codes enabling the switching nodes to correctly route the blocks. The blocks from an incoming line which arrive at the switching node are transmitted onto an outgoing line while converting the header. Since two or more blocks may arrive for the same output line during a frame, so-called queue buffers have to be provided in the switching node. In the queue buffer one or more of these blocks are temporarily stored until there is a frame available for them.

With respect to the buffer arrangement, the switching nodes can be centrally buffered systems (as disclosed in the European Patent Application EP-A-0-183-592), or decentrally buffered systems. With centrally buffered systems there is only a single buffer to which each incoming line delivers its arriving blocks and from which each outgoing line again reads out blocks intended for the latter line. Systems with decentralized buffering are further distinguished as to whether a buffering of blocks only takes place on the input side (an embodiment thereof is described, for example, in the not previously published German Patent Application with DE-A-37-14-385) or whether the buffers are arranged only before the outgoing lines (compare, for example, IEEE 1987 Int. Switching Symp., Phoenix, March 1987, pp. B 10.2.1 ff., "The Knockout Switch: A Simple, Modular Architecture for High-Performance Packet Switching" by Y. S. Yeh et al.) or whether systems with both input and output buffering are concerned.

For avoiding overload in wideband switching systems of any buffer arrangement, appropriate equipment has to be provided in each switching node. From a contribution by J. S. Turner "New Directions in Communications" at the International Zürich Seminar on Digital Communications, March 1986, pp. A 3.1 to A 3.8, a circuit arrangement is known according to which a bidirectional counter is provided in the switching node, which counter counts the blocks transmitted from the subscriber station and decrements the count at specific instants in accordance with the transmission rate determined by the subscriber station. If the bidirectional counter exceeds a count that can be specified by the subscriber station, the switching node will recognize overload (leaky-bucket method).

In FIG. 1 the circuit arrangement is represented on which the said leaky-bucket method is based, in so far as this is required for comprehending the invention. The bidirectional counter VRZ increments according to the leaky-bucket method with each block coming from the subscriber station T, and decrements at specific instants (clock C). The count of the bidirectional counter VRZ is compared by means of a comparator V to the count that has been predetermined by the subscriber station T (by which the maximum bit rate is determined) and has been stored in a memory S provided in the switching node VK.

If this count stored in the memory S is equal to 1, it can be easily verified whether the maximum permissible bit rate is adhered to. If the count stored in memory S is chosen to be greater than 1;t can be verified whether a predeterminable mean value of the bit rate is adhered to.

In a wideband switching system in which the messages are transmitted over the wideband transmission links according to the a synchronous time-division multiplex method, both the duration of the connection and the number of transmitted blocks are to be determined for the purpose of charging.

BRIEF DESCRIPTION OF THE INVENTION

The invention has for its object to provide a circuit arrangement for avoiding overload in a wideband switching system such that in a simple way overload is avoided and charging can be effected.

According to the invention this object is achieved with the aid of a circuit( arrangement having the characteristic features of claim 1.

Providing two up-counters in the switching node for each individual subscriber station implies an increase in hardware compared to the circuit arrangement according to Turner et al. With the circuit arrangement according to the invention, however, a metering of charges can be effected in a surprisingly simple way. The circuit arrangement according to the invention has the additional advantage that in a surprisingly simple way the utilization of the line for the duration of the connection can be determined. Thereby, an aid for dimensioning the network is made available to the operator of the wideband switching system.

The hardware for determining the ratio between the counts can be simply reduced with an embodiment as claimed in claim 2. By means of the provided comparator the difference between the counts is determined and a criterion for overload is derived therefrom.

BRIEF DESCRIPTION OF THE DRAWING

The invention will be further described and explained with reference to the drawing representing an exemplary embodiment, in which.

DETAILED DESCRIPTION OF THE INVENTION

The circuit arrangement structured according to the known "leaky-bucket" method has already been extensively described.

Figure 1:
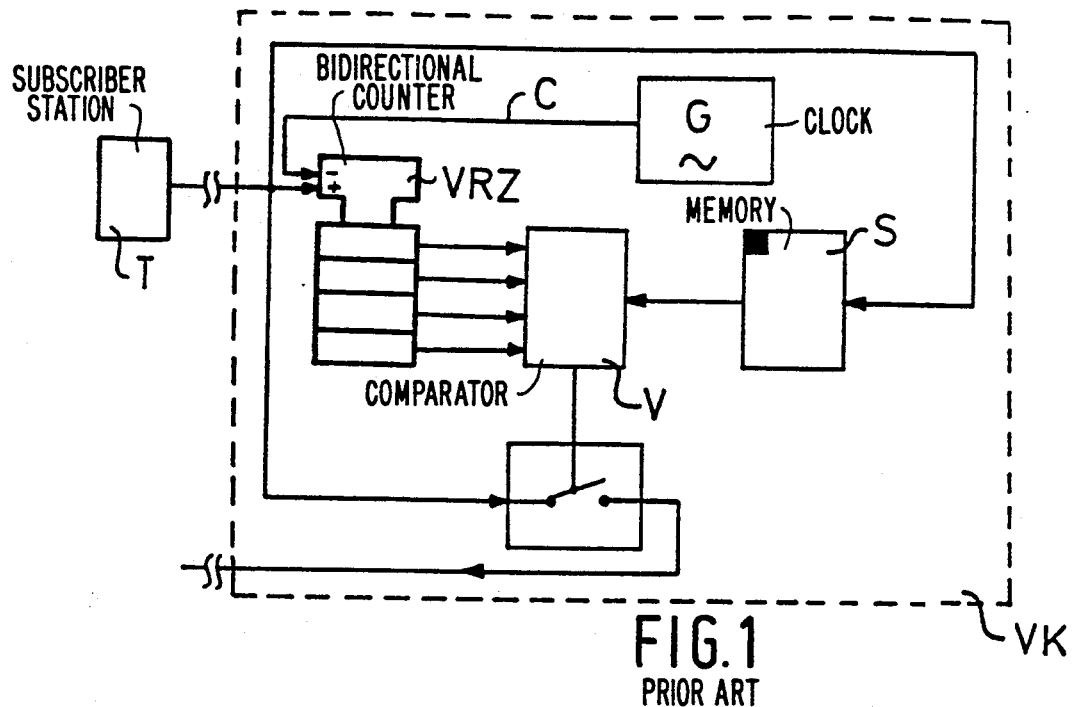
FIG. 1 shows a circuit arrangement structured according to known "leaky-bucket" method.
Figure 2:
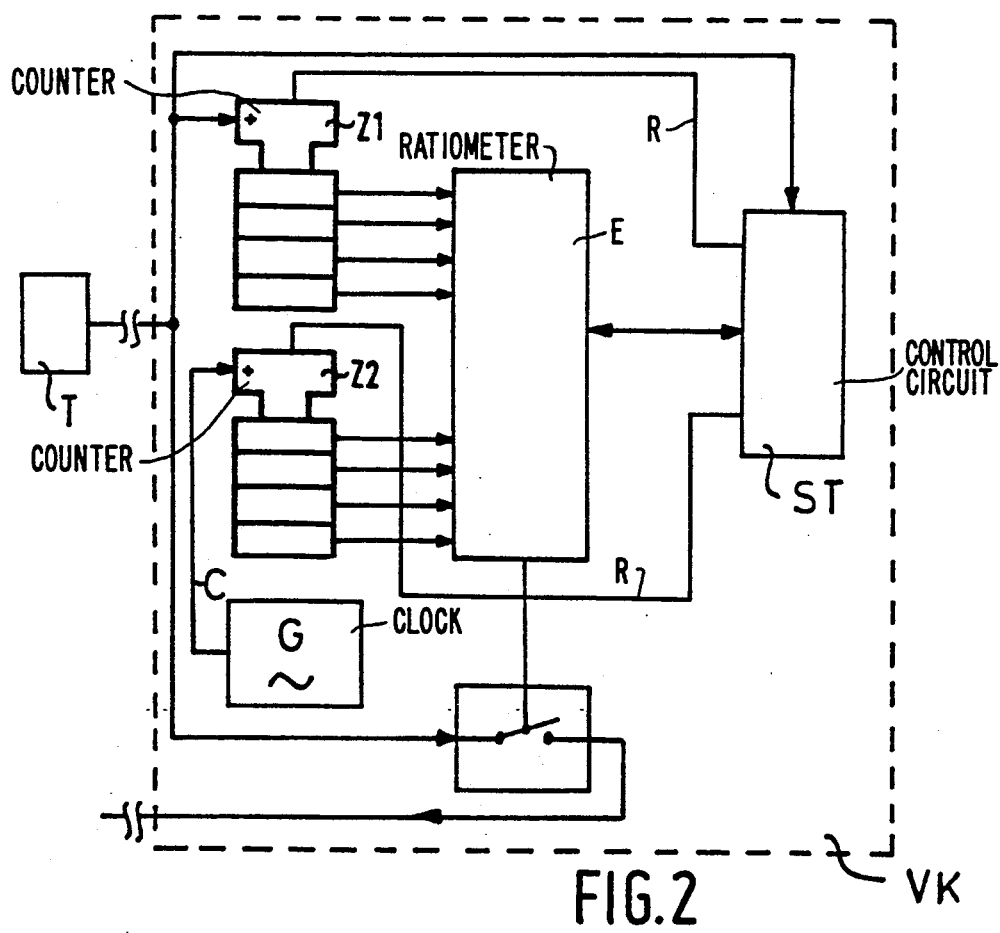
FIG. 2 shows the circuit arrangement according to the invention.

By means of the circuit arrangement represented in FIG. 2 both the occurrence of overload situations can be avoided in a reliable way and also the charge metering can be effected in a surprisingly simple way. For each subscriber station T two up-counters Z1, Z2 are arranged in the switching node VK. The first counter Z1 counts the blocks coming from the subscriber station T and with the aid of the second counter Z2 the accumulated connection time is determined during the existing connection. The two counters Z1, Z2 are connected to an arrangement F for forming the ratio between the counts. By means of arrangement E, in co-operation with a control circuit ST, it is verified whether the mean and the maximum bit rate, which are determined by the subscriber station T, are adhered to.

At the beginning of the connection the counts of both counters Z1, Z2 are set equal to zero by reset lines R. When adhering to the chosen bit rates, the count of the second counter Z2 when adhering to is smaller than or at most equal to the count of the first counter Z1. The ratio of the count of the first counter Z1 to the count of the second counter formed in the arrangement E represents a mean value with respect to the maximum bit rate. If this ratio exceeds a predeterminable limit value, the switching node VK (i.e. control circuit ST) recognizes overload and releases the established connection oz refuses the blocks sent by the subscriber station T or assigns the connection to another service with a higher bit rate and consequently higher charges.

By evaluating the counts, the charge metering can be effected in a surprisingly simple way because during the existing connection the count of the first counter Z1 denotes the blocks sent by the subscriber station T and the count of the counter Z2 shows the accumulated time of the connection. The counts are scanned by the control circuit ST in specific time intervals and stored in a storage means not represented in the drawing. The period of the scanning is a system parameter preset by the wideband switching system, that is to say, the presetting is effected in view of the policing function carried out by the control circuit ST.

If a comparator is used for the arrangement E, the hardware can be reduced in a simple manner, the limit value for recognizing overload resulting from the established difference between the two counts.

In addition to the metering of charges, the utilization of the line during the connection can also be determined in a surprisingly simple way in that over a certain time interval a moving average of the measuring values (ratios) entering the arrangement E is formed. On the basis of these measuring values the dimensioning of the network can be effected.

What is claimed is:

1. A circuit arrangement for avoiding overload in a wideband switching system, in which messages are subdivided into blocks and transmitted over wideband transmission links according to an synchronous time-division multiplex method, comprising:
   block counter means for counting the blocks sent by a subscriber station;
   connection time counter means for determining the connection time accumulated during the existing condition; and
   monitoring means connected to the block counter and the connection time counter for monitoring the usage of the switching system.

2. A circuit arrangement as claimed in claim 1 in which the monitoring means comprises a program controlled circuit connected to the block and connection time counters for scanning the counts and storage means connected thereto for storing the counts.

3. A circuit arrangement as claimed in claim 1, in which the monitoring means comprises a comparator.

4. An overload detector for a switching system for connecting a plurality of stations comprising:
   block counter means for generating a block count representing the number of message blocks transmitted via the switching system during a connection between stations;
   duration counter means for generating a time count representing the duration of the connection; and
   means for generating an overload signal in response to the ratio of said block count and time count.

5. The overload detector of claim 4 comprising charge metering means responsive to the block count and time count.

6. An overload detector as set forth in claim 4 comprising means for determining a moving average of said ratio over a selected time interval.

7. An overload detector for a switching system for connecting a plurality of stations comprising:
   block counter means for generating a block count representing the number of message blocks transmitted via the switching system during a connection between stations;
   duration counter means for generating a time count representing the duration of the connection; and
   comparator means responsive to the differences between said block count and said time count for generating an overload signal when said difference exceeds a predetermined value 8. The overload detector of claim 7 comprising charge metering means responsive to the block count and time count.

* * * * *